(No Model.)  J. B. HAMMOND.  4 Sheets—Sheet 1.
TYPE WRITER.
No. 253,475.  Patented Feb. 7, 1882.
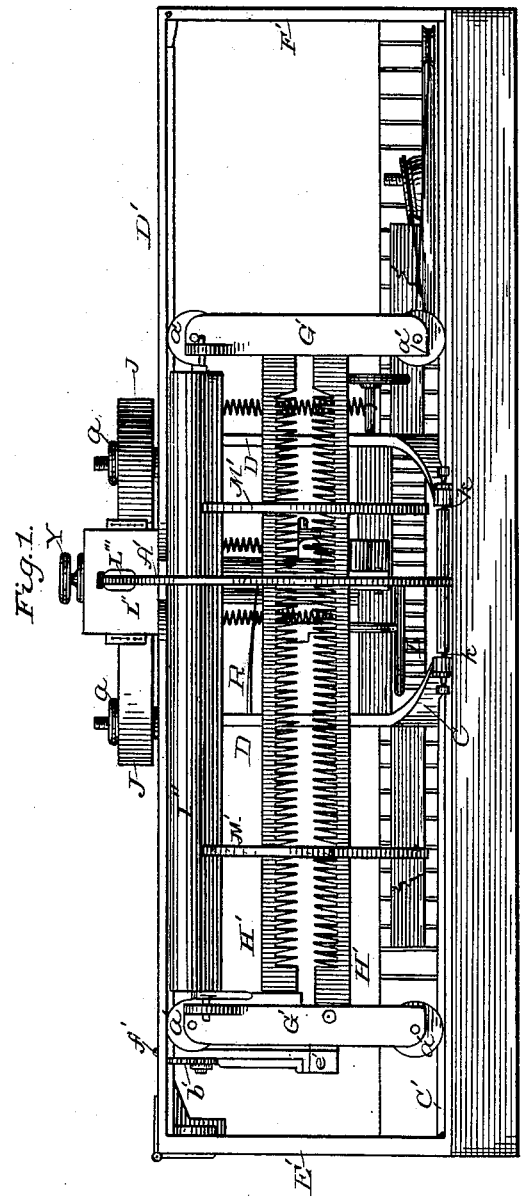

(No Model.)  4 Sheets—Sheet 2.
J. B. HAMMOND.
TYPE WRITER.
No. 253,475.  Patented Feb. 7, 1882.
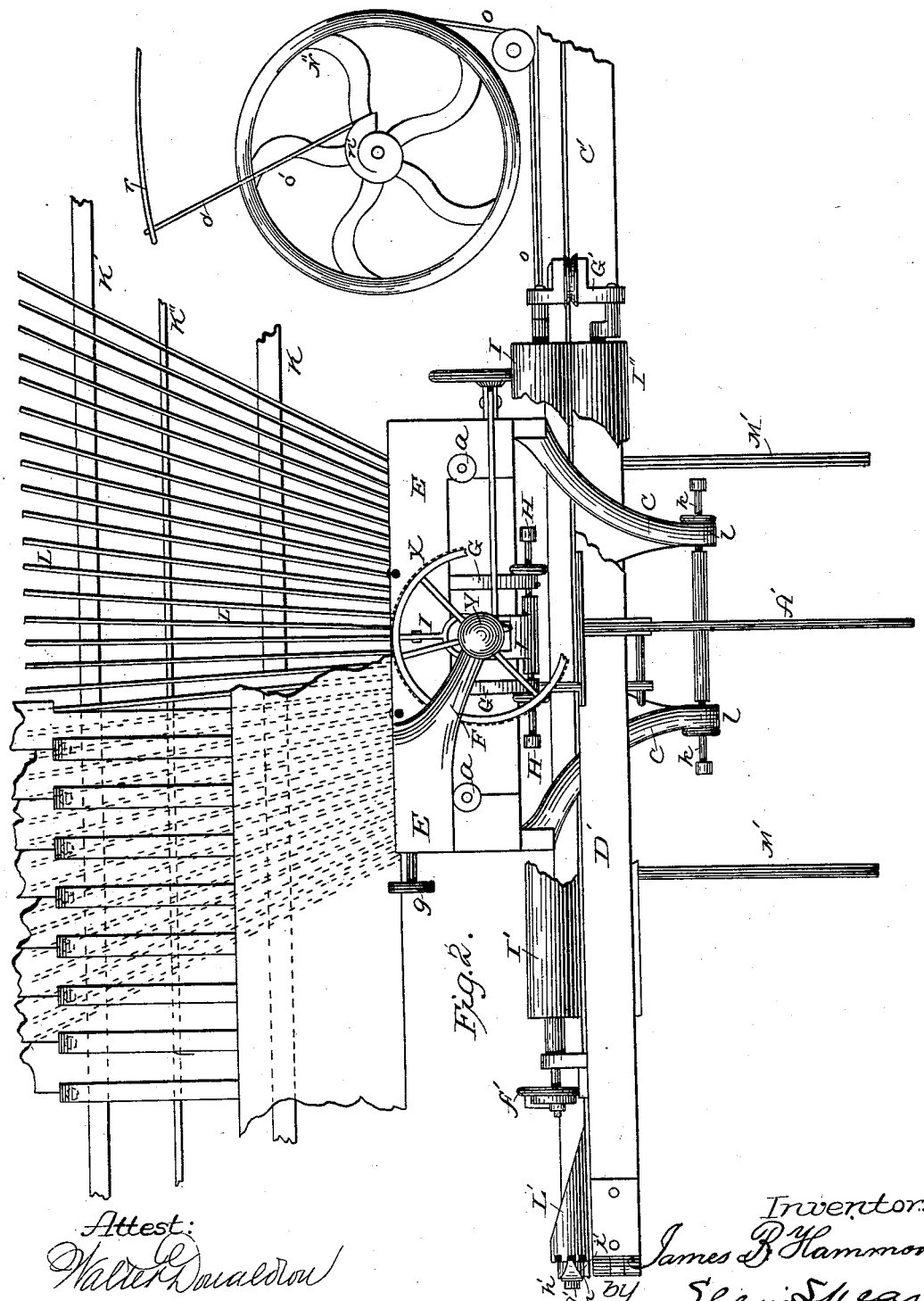
Attest:
Walter Donaldson
F. L. Middleton
Inventor:
James B. Hammond
By Ellis Spear
Attorney

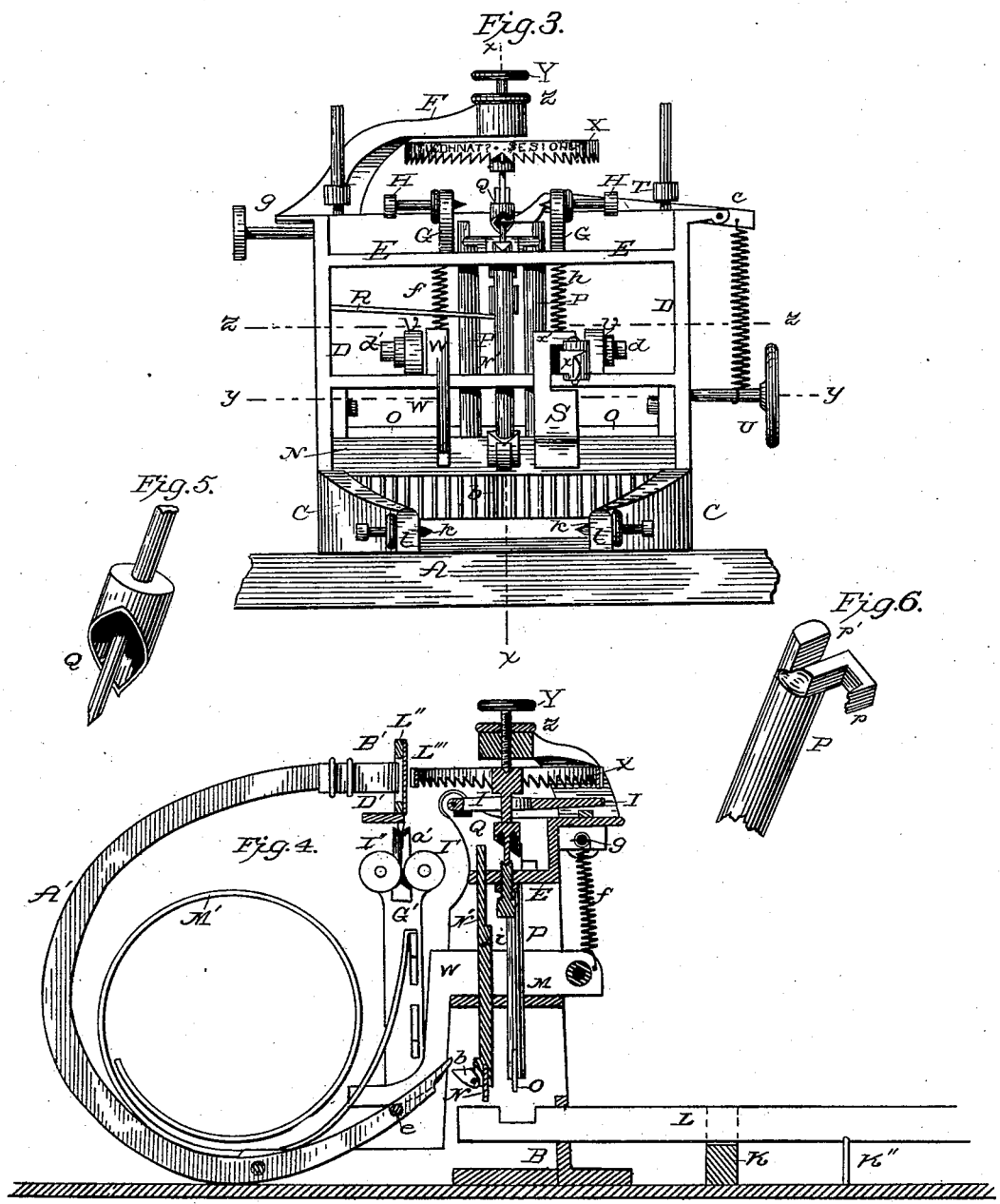

(No Model.)  4 Sheets—Sheet 4.
J. B. HAMMOND.
TYPE WRITER.
No. 253,475.  Patented Feb. 7, 1882.
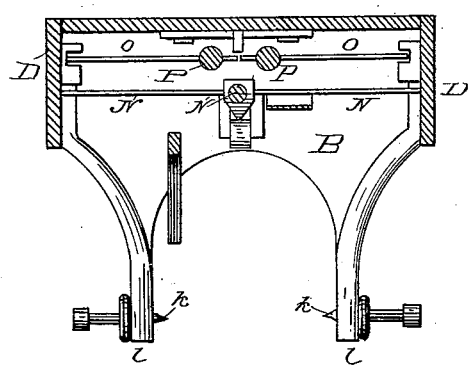
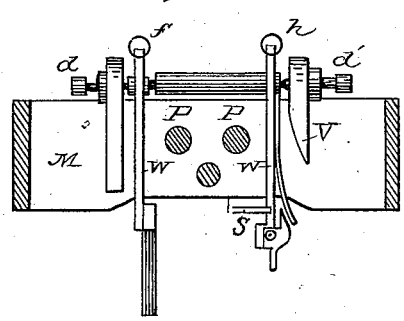
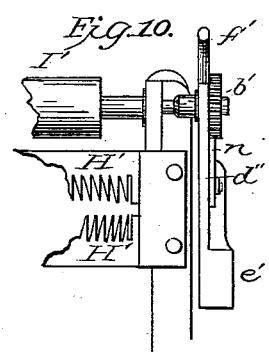
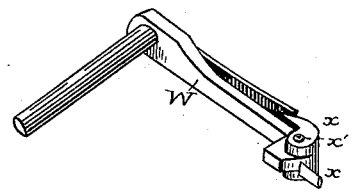
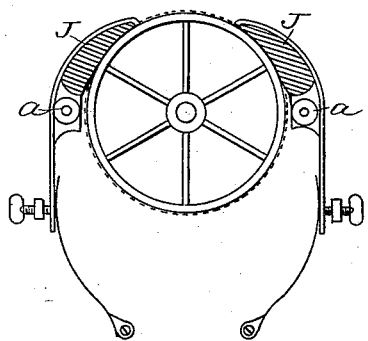
Attest:
Walter Donaldson
F. L. Middleton
Inventor
James B. Hammond
by Ellis Spear
Attorney

UNITED STATES PATENT OFFICE.

JAMES B. HAMMOND, OF NEW YORK, N. Y.

TYPE-WRITER.

SPECIFICATION forming part of Letters Patent No. 253,475, dated February 7, 1882.

Application filed January 10, 1882. (No model.)

*To all whom it may concern:*

Be it known that I, JAMES B. HAMMOND, of New York, in the county of New York and State of New York, have invented a new and useful Improvement in Type-Writers; and I do hereby declare that the following is a full, clear, and exact description of the same.

My invention relates to certain new and useful improvements upon that class of type-writers described in other applications for Letters Patent previously filed by me.

The objects of my present invention are simplification of construction, accuracy in operation, and concentration of the structure, all as will be more fully explained hereinafter.

To enable those skilled in the art to fully understand my present invention, I will describe the construction and operation, referring by letter to the accompanying drawings, in which—

Figure 1 is a rear view of a machine embodying the features of my invention. Fig. 2 is a top view with type-wheel partially broken away and the ink-pads removed. Fig. 3 is a rear view with the paper-carriage and guide, hammer, inking-pads, and type-wheel stop-lever all removed to more fully illustrate the parts concealed in Fig. 1. Fig. 4 is a vertical section on the line $x$ $x$. Fig. 5 is an enlarged perspective view of the double-faced cam on the type-wheel shaft. Fig. 6 is a similar view of the upper operative end of one of the two posts rising from the front frames operated upon by the keys. Fig. 7 is a cross-section at line $y$ $y$, Fig. 3. Fig. 8 is a section at line $z$ $z$, Fig. 3. Fig. 9 is a detached view of pawl and lever. Fig. 10 is a side view of the paper-lifting weighted pawl and pinion end of roll-shaft. Fig. 11 is a top view of the inking-pads.

Similar letters represent the same parts in all the figures.

A is the bed of the machine, and B the bottom plate of the metallic frame containing the mechanism for operating the several parts of the machine, and is secured to the bed A in any suitable manner. This plate rises up at either end, as seen at C, to form a support for the sides D D, which are secured thereto by bolts or screws.

E is the top of the frame, formed with an upwardly-projecting arm, F, reaching over the shaft of the type-wheel, and adapted to receive a screw-bearing for the upper end of said type-wheel shaft.

G G are two brackets, mounted upon or cast with the top E, provided with conical screw-bearings H H, between which is held a vibrating lever, I. (More clearly seen at Fig. 2.)

J J are inking-pads, (shown more fully in Fig. 11,) secured adjustably to the top by thumb-screws $a$ $a$, in order that they may cause ink to be applied to the type and yet be nicely adjusted so as not to impede the rotation of the wheel.

K K' are two parallel guide-strips secured to the bed A of the machine, and provided with a proper number of slots or kerfs to receive the key-levers L, which are arranged, as shown, to converge under the wheel-operating frames.

$K^2$ is a metal strip secured between the guide-strips K K'. It has its top edge beveled or sharpened to form a fulcrum for all the key-levers L, as clearly shown in Fig. 4, the bottom edge of the key-levers, when they are in their normal position, resting upon a suitable horizontal rib on the bottom plate, B.

Within suitable guides or grooves in the sides D, and beneath a division-plate, M, is arranged a vertically-sliding bar or frame, N, and in front thereof two frames, O O, each of half the length of frame N. On the inner ends of the frames O O are mounted and secured vertical posts P, the tops of which are formed as clearly shown in Fig. 6, the portion $p$ striking under or upon the edge of the double-faced cam Q, while that portion marked $p'$ is cut away and passes by without touching the stop-lever I. These posts, passing through suitable holes or slots in the plate M and top E, are guided properly.

It will be observed that there are two posts P, which are moved by their appropriate levers L L through the frames O O, to which they are attached. The projections or fingers $p$, upon the upper end of the post P, project inwardly toward each other, and terminate, when depressed, a little below the lower point of the double-faced cam Q. They are in such relation to each other and to the point of the double-faced cam that a vertical line from the lower and central point of the cam, when the type-wheel is in its normal position, will pass midway between the two inner ends of these projections $p$. As the posts P move in fixed guides, it is apparent that the upward movement of one of these posts will cause the projection $p$ to impinge against the inclined surface on one side of the double-faced cam, and as the cam is fixed upon the shaft of the type-wheel, it will cause that shaft, and with it the type-wheel, to revolve. It will also appear from the drawings, and from the description of the parts, that the projection $p$ on one side, when lifted, will turn the cam and its shaft in one direction, while the same motion of the projection $p$ upon the other side will move the cam and turn the shaft in the opposite direction; and since the point of the double-faced cam rests, when the type-wheel is in its normal position, in the vertical plane passing midway between the inwardly-projecting ends of the two arms $p$, it is manifest that these movements will begin from the same point, whichever way the cam be turned.

The means for returning the cam and the type-wheel to their normal position will be elsewhere described; but it will clearly appear from an inspection of the drawings alone that the movements of the parts will be as described, and also that the amount of motion imparted to the cam Q by the elevation of the projection $p$ will be measured exactly by the amount of that elevation, since the face of the cam in contact with the end of the projection $p$ is a moving inclined plane, which is pushed farther and farther aside as the projection rises. The action of the keys upon these vertical posts P will be hereinafter more fully described; but as it is through the levers L acting upon the plates O that the posts P are raised, it is apparent that each lever appropriated to any particular letter upon the edge of the type-wheel must be so adjusted to the plate O as to raise that plate, and with it the post P, a distance just sufficient to revolve the cam Q and the type-wheel the proper distance to bring the designated letter exactly opposite the hammer from which it is to receive the impression.

The rear frame, N, at its center, has erected a bar or post, N', guided by slots or holes in the plate M and top E, the top of which post, coming in contact with the under surface of the stop-lever I at the end of its movement, causes it to arrest and steady the wheel, while the hammer, tripping from the pawl $b$, throws the paper against the wheel, and, rebounding, assumes the position shown in Fig. 4, this post N' and the frame N being automatically returned to their normal position always by a straight arm spring, R, in an obvious manner.

To the rear side of the frame N, and centrally, is secured by a pivot $a$ lifting-pawl, $b$, which strikes one end of the hammer when the frame N is raised, and swings by and under the hammer-lever again as the frame N is returned by the spring R. At one side of this pawl there is also secured to the frame N an upright, S, slotted on one side, near its top, as seen at Fig. 3, to partially surround the rear end of the feed-pawl lever W', pivoted at the front end, which is clearly seen in Figs. 8 and 9, so that when the frame N has risen a given distance the under side of the slot will come in contact with the under side of the feed-pawl lever W', and any further movement of the frame will lift the feed-lever, in the manner and for the purpose hereinafter explained.

T is a lever pivoted at $c$ to the frame. Its inner end is spear-headed and lies under the edge of the double-faced cam Q, and its outer end is connected by a spiral spring to a regulating-screw, U, the tendency and operation of this lever being to return the type-wheel to its normal position, and also to assist, if necessary, in the return of the lifting posts P P and their frames to their normal position.

V V are two brackets on top and near the front edge of the plate M, and through these pass pointed screw-bearings $d$ $d'$. The former passes through the right-angle lever W, and the points of both enter cavities or centers in the opposite ends of the shaft of the feed-pawl lever W'. The lever W extends backward and downward, and rests upon a horizontal pin, $e$, in the lower end of the hammer-lever, to force it into the position shown in Fig. 4, the further motion required for pressing the paper against the wheel being obtained by the momentum thus far imparted to the hammer by the spring-lever W, which is prevented from following the hammer by contact with the plate M, the celerity and power with which this action is produced being regulated by a tension-spring, $f$, connected to the lever and a regulating screw-shaft, $g$, the front end of the feed-pawl lever being also connected by a tension-spring, $h$, to the frame, for the purpose of returning the free end, with its pawl, to its normal position.

To the rear end of the lever W' is secured, by a vertical pivot, $x'$, a spring-pawl, $x$, the curved end of which projects between the combs, and lies within the kerfs thereof as it is raised or lowered. The pivoting of the pawl permits it to swing out of the way as the carriage is returned or pushed back, but holds it against any forward movement, except in the manner hereinafter described.

X is the type-wheel, with the type arranged upon its perimeter, according to the more frequent use of any particular letter, on either side of a zero-point, which, in a state of rest, is opposite the hammer or impression-point. The order of arrangement, as above suggested, is such that those letters most frequently used are nearest the zero-point, on either side thereof, and those less frequently used are more remote, as follows: 8, 6, 4, 2, Z, Q, K, B, W, G, U, C, D, H, N, A, T, ?, —, (zero-point,) ., $, E, S, I, O, R, L, F, M, P, Y, V, J, X, 3, 5, 7, 9. The advantages of this arrangement are that the necessary motion of the wheel is very much diminished, thus saving wear and gaining rapidity of action—both of great importance. The upper or hub end of the shaft of said wheel is centered to receive the screw-bearing Y, which is held in place by a jam-nut, z, and the lower end of the shaft is pointed to enter a center in a screw-bearing, i, passing up through the top plate, E. The worm or double-faced cam is formed with or secured to the shaft at a proper point between the bearings of the shaft, and it will be observed that the wheel is free to be rotated in either direction.

A' is a hammer-lever, C-shaped, and pivoted at the bottom curve between two screw-bearings, k k, passing through rear projections, l l, of the side frames, C. The upper end of the lever A' may be provided with a rubber or other head or pad, B', to aid in producing a correct and perfect impression upon the paper between it and the type in alignment therewith.

C' is a rail secured to the bed A, and D' is another, secured at one end by a hinge to an end piece, E', and adapted to lie within and be fastened to a similar end piece, F', at the other end.

The paper-carriage consists of two vertical end pieces, G', provided with grooved rollers a' at top and bottom, which hold the carriage in a vertical position and permit it to be driven back and forth between the rails. The end pieces are connected by two combs, H', arranged one above the other in such relation that the teeth of one are opposite the spaces or kerfs in the other. These combs are separated a distance somewhat less than the vertical dimension of the feed-pawl x on the end of lever W', the result of such construction being that as the feed-pawl lever is raised from a kerf or slot in the lower comb it will enter a similar kerf in the upper comb, the carriage being permitted to move forward a distance only equal to the difference in locality of the said kerfs, which is always equal to one-half a proper space between letters in writing, the other half of the motion being completed on the return of the pawl x.

In the top of the end pieces, G', of the carriage are journaled the shafts of two elastic rollers, I' and I''. The shaft of the latter is eccentrically hung, as clearly shown at Fig. 2, in order that the two may be readily separated for the insertion or removal of the paper.

At one end of the shaft of the roll I' is fixed a pinion, b', and to the same shaft is loosely hung a lever, d'', weighted at its bottom e', and curved at its top end, f'. (See Fig. 10.)

L' is an incline or worm secured by a central set-screw, g', to a short arm, h', projecting from the side of the end E' of the paper-carriage frame. In the head of the worm or incline L' are several depressions or slots, i, adapted to receive the tail of a spring, m. By means of such construction the worm or incline may be turned upon its pivot-screw g', and held by the spring m in different positions, in order to give a longer or shorter action to the lever d''. When the carriage is drawn back to the starting-point the bent end f' of the lever comes in contact with or moves under the incline or curve of the worm L', and is consequently forced down, and through the spring-pawl n, engaging with the pinion b', the shaft, with its roller I', is turned a distance sufficient to throw up the paper a distance equal to the space between lines. This movement may be varied, as heretofore alluded to, by increasing or diminishing the length of action of the worm L'. As the carriage travels away from the worm L' the weight e' on the lower end of lever d'' brings the lever back by gravity in position to again become operative for raising the paper.

L'' is a vertical plate secured to the top rail of the carriage-track, and is provided with a slot, through which the end of the hammer passes in pressing the paper against the type. This slot may or may not be covered by a flexible diaphragm or tympan, L'''.

To the rear side of the upper comb, H', are secured two or more helical paper-holders, M', within which the tail of the sheet of paper to be printed is coiled, thus avoiding the necessity of great depth in the machine. The carriage is returned to the starting-point by any of the well-known spring-and-treadle devices, and it is automatically fed forward by means of a wheel, N'', having a groove in its periphery, in which runs a pull-cord, o, one end of which is secured at any proper point to the said wheel, and the opposite end attached to the carriage, said wheel at its hub having a fusee or eccentric, n', around which is wound another cord, o', one end of which is connected to a bar-spring, r. It will be seen that as the carriage is returned to the starting-point the wheel N'' is rotated and the cord o' wound around the eccentric hub n' and the spring r distorted, so that the tendency of the spring and cord o' is to reverse the movement of the wheel, which will drag along the carriage as the feed-pawl is operated back and forth between the combs of the carriage. As the carriage is returned the spring feed-pawl x swings out of the way, as before described, but immediately takes its place again between the teeth of the comb when the back movement of the carriage is suspended, and prevents the forward movement, except for spacing purposes. It will be seen that by this arrangement the carriage may be readily returned to any point for correction, &c.

The construction and operation of the paper-feed rolls enable me to adjust the paper vertically to place readily anything to be written on whatever part of the page I may choose.

The key-levers L are surmounted by a suitable key-board, the keys of which are arranged to strike and force down the front end of their respective underlying key-levers. The rear ends of these levers all have the same distance to pass through, and all raise the rear frame, N, the distance required to trip the hammer, release the paper-carriage, and arrest the wheel, as described. The lower or depending edge of the type-wheel is provided with two series of notches or serrations, arranged on opposite sides of its zero-point, each notch having a vertical and an inclined surface; but the inclined surfaces of one series of notches are inclined in an opposite direction from those of the other series, the vertical surfaces of the two series constituting a double series of arresting-surfaces. The two frames O, which in turn operate the wheel in opposite directions by the action of the levers upon them, have a different distance of motion or action upon the wheel, determined by the portion cut away from the key-lever at the point of its action upon the frame O, so that the wheel may be in any one of the positions corresponding to the different letters upon the front portion of the key-levers when the arresting-lever, the feed-pawl, and the trip-hammer complete their action. The return of any key-lever to rest allows the return of the wheel, with its operative frame, to a normal position, the feed-pawl returns into the next kerf of the opposite comb, and the trip-pawl resumes its position under the tail of the trip hammer by the return of the operative frame N. One key-lever is arranged to operate simply to form the spaces between the words, or for wider spaces, if desired, between the letters. This is accomplished by so forming the rear end of the lever that it will throw the pawl $b$ out of engagement with the end of the hammer-lever, and then lift the rear frame, N, and feed-pawl lever W′, which permits the paper-carriage to be automatically fed forward. Nothing more is necessary for this purpose than a lug or projection on the end of the lever, extending upward to strike the pawl $b$ and remove it from the range of the tail of the hammer A′ before the lever L commences its action upon the frame N. The type-wheel shaft being provided with the double-faced cam Q permits the rotation of the wheel in opposite directions.

For the purpose of the more rapid operation of the machine the letters upon the face of the wheel, and the keys corresponding therewith, are, as before explained, arranged with special reference to frequency with which any letter or letters are used, so that the keys are not only located at the most convenient point, but the type-wheel makes the least amount of movement from its zero or starting point to bring such letters into position.

Operation: The paper to be printed being placed in position and the carriage drawn back to the initial point, the keys are depressed successively, the rear ends of the key-levers operating upon the lifting frames N O, causing the type-wheel to rotate to bring the proper letter into alignment, the checking-lever to be thrown up to hold the wheel in position, the feed-pawl raised and the hammer tripped, which, striking the paper and immediately rebounding, causes it to be pressed against the type and receive the impression, said type having been inked by the pads J. The wheel N″ and its cords $o\ o'$ and spring $r$ pull the carriage automatically forward as the several devices return to their normal position a distance equal to the proper space between the letters. The type-wheel X is returned to position, irrespective of the direction of its rotation, by the spear-headed spring-lever T. When the full line is printed the carriage is returned, and the lever-arm $f''$, traveling under the worm L′, is depressed, and the roll I′ caused to rotate and lift the paper between it and roll I″ a distance equal exactly to the space between the lines, when the operation of printing or writing may be resumed.

It will be observed that by the construction and arrangement of the several parts a machine is produced compact in dimensions, and permitting the operator to readily see his work as it progresses, and enabling him to correct errors and locate the matter at pleasure.

I do not claim broadly a type-wheel moving to right or left from a normal point, nor means for arresting and returning the same after such movement, these matters having been claimed in an application filed by me in the United States Patent Office on the 21st day of June, 1877.

What I claim as new, and desire to secure by Letters Patent, is—

1. A type-wheel provided with a double series of arresting-surfaces on either side of a zero-point, and facing in opposite directions, substantially as described, and a stop-lever, I, which arrests the wheel moving in opposite directions.

2. In combination with the feed-pawl $x$, constructed as described, and the paper-carriage, the double combs H′.

3. In combination with the paper-carriage of a type-writing machine, the wheel N″, with its cords $o\ o'$ and spring $r$, arranged and operating substantially as and for the purposes set forth.

4. In combination with the carriage and guiding-rails, the rolls I′ I″, worm L′, weighted pawl-lever $d''$, and pinion $b'$, for raising the paper, substantially as set forth.

5. A type-wheel, in combination with means, substantially as described, for vibrating the same, and means, as described, for retaining it, and means, as described, for returning it to normal position, said wheel having the letters or characters arranged on its periphery on either side of a zero-point, in manner set forth, whereby those most frequently used shall be nearest to the said zero-point, all as described.

6. The helical paper-holders M′, secured to the carriage-frame, and adapted to receive the paper.

7. The type-wheel X, formed with a suitable shaft and a double-faced cam, and secured in position independently by means of bearings Y $i$.

8. In combination with the type-wheel and double-faced cam Q, the frames O, posts P, and operating-levers L.

9. In combination with the levers L, frames O, and type-wheel X, the frame N, provided with lifting-pawl $b$ and hammer A′.

10. In a type-writing machine, the combination, with a type-wheel adapted to turn on its bearings in either direction from a normal position through a series of characters to present any given letter to the paper, of finger key-levers by which the operating power is applied, of intermediate mechanism, as described, between said key-levers and the wheel, by which the proper motion is imparted to said wheel, and of a stop mechanism, substantially as described, set in motion by the key-levers, and acting in opposition to the motion imparted to the type-wheel to arrest said type-wheel at the proper point, as set forth.

11. A type-wheel adapted to turn on its bearings from a normal point in either direction through a series of characters to bring any one of said series of characters to said point, key-levers, and intermediate mechanism, substantially as described, whereby said right and left hand motion is communicated to said wheel, a stop mechanism set in motion by the key-levers, and adapted to arrest the said wheel at a series of points on the right or left, substantially as set forth.

In testimony whereof I have signed my name to this specification in the presence of two subscribing witnesses.

JAS. B. HAMMOND.

Witnesses:
JOHN PROCTER CLARKE,
SAML. M. HITCHCOCK.